No. 884,664. PATENTED APR. 14, 1908.
E. W. JUNGNER.
DEPOLARIZER FOR GALVANIC BATTERIES.
APPLICATION FILED MAY 14, 1907.
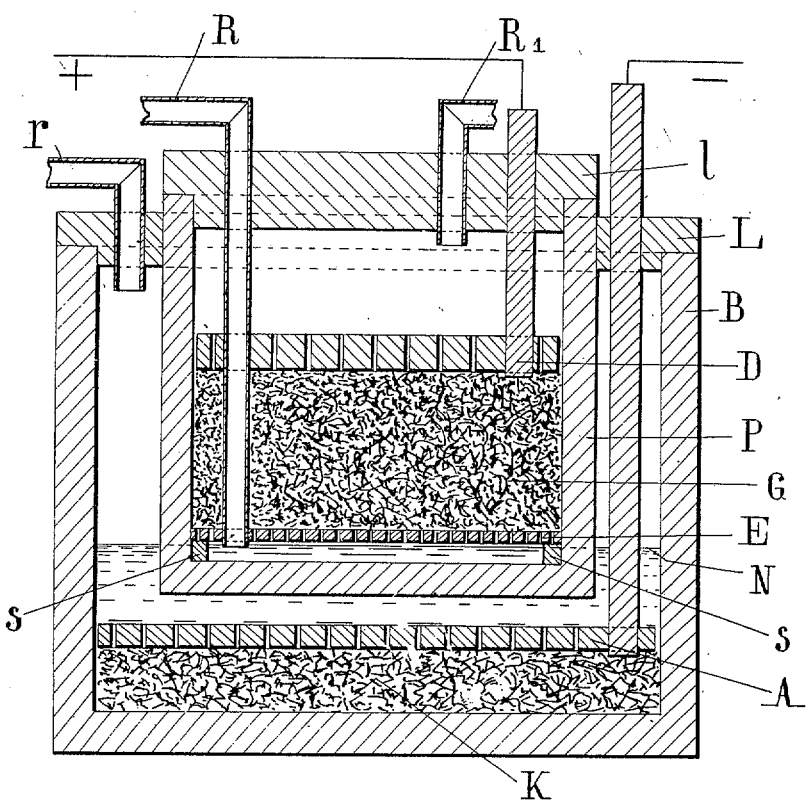
Witnesses.
Jesse N. Lutton.
Inventor.
Ernst Waldemar Jungner.
by Henry Orth
Atty.

UNITED STATES PATENT OFFICE.

ERNST WALDEMAR JUNGNER, OF KNEIPPBADEN, NORRKÖPING, SWEDEN.

DEPOLARIZER FOR GALVANIC BATTERIES.

No. 884,664.  Specification of Letters Patent.  Patented April 14, 1908.

Application filed May 14, 1907. Serial No. 373,575.

*To all whom it may concern:*

Be it known that I, ERNST WALDEMAR JUNGNER, a subject of the King of Sweden, residing at Kneippbaden, Norrköping, Sweden, have invented certain new and useful Improvements in Depolarizers for Galvanic Batteries; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to electric batteries, and has for its object the construction of an electrical battery by means of which the energy delivered by the oxidation of the carbon is converted into electricity.

The invention is founded on the well-known fact that nitric oxid and oxygen in the presence of highly concentrated sulfuric acid unite with each other and with the acid to form nitrosyl-sulfuric acid, in accordance with the following reaction—

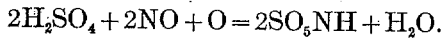
$$2H_2SO_4 + 2NO + O = 2SO_5NH + H_2O.$$

This compound, as is well known, is readily soluble in concentrated sulfuric acid, and is stable, even when heated. This nitrosyl-sulfuric acid is a powerful medium of oxidation in the presence of oxygen, and can therefore be used in the presence of oxygen gas as a depolarizer in galvanic elements.

The solution of nitrosyl-sulfuric acid in highly concentrated sulfuric acid forms a powerful depolarizer, as the same takes up nascent hydrogen, whereby sulfuric acid and nitric oxid are formed according to the following equation—

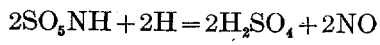
$$2SO_5NH + 2H = 2H_2SO_4 + 2NO$$

consequently, oxygen being present, the same combines with the nitric oxid, and the reformation of the nitrosyl-sulfuric acid takes place according to the first equation.

The accompanying drawing illustrates such an element in which nitrosyl-sulfuric acid may be so used.

The vessel, B, is of earthenware, and on the bottom thereof is placed a layer, K, of electrically conductive amorphous carbon, for example, coke. Over the layer of coke is placed a perforated plate, A, of graphite, having a conductive terminal inserted therein, preferably also of graphite.

In the vessel B is placed a smaller, porous vessel P, preferably made of porous clay. This latter vessel is partly filled with pieces of porous graphite G, saturated with a solution of nitrosyl-sulfuric acid dissolved in concentrated sulfuric acid, the pieces of graphite being of such size as not to form capillary spaces between them.

The pieces of graphite, G, are supported above the bottom of the porous vessel on a finely divided perforated plate E of ebonite or other suitable material, said plate being held above the bottom of the porous cup or vessel by means of supports S, also of an insulating material insoluble in the electrolyte, as ebonite. Over the layer of pieces of graphite is placed a perforated plate D of graphite, provided with a conductive terminal, likewise of graphite. Through the graphite plate D, the layer of graphite G and the ebonite plate E passes a tube R of glass or other suitable material. The vessels are filled with a solution of nitrosyl-sulfuric acid in concentrated sulfuric acid to a lever, as N, somewhat above the bottom of the porous cup P and below the ebonite supporting plate E. Both vessels are provided with air-tight covers L and l, through which pass the electrode terminals and tubes R, $R_1$, and r.

If air is introduced through tube R to the space between the electrolyte level N and the ebonite supporting plate E, it penetrates uniformly through the ebonite plate and the layer of graphite on it, passing out through the outlet tube $R_1$.

If the electrodes be connected together through some suitable resistance, an electric current will be obtained passing from D to A, especially if the apparatus be heated slightly. The coke will thus be oxidized, the final reaction being as follows:—

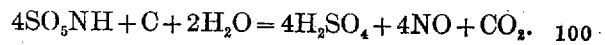
$$4SO_5NH + C + 2H_2O = 4H_2SO_4 + 4NO + CO_2.$$

The nitric oxid unites immediately with the oxygen of the air between the graphite particles with the reformation of nitrosyl-sulfuric acid, as follows—

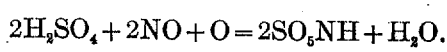
$$2H_2SO_4 + 2NO + O = 2SO_5NH + H_2O.$$

The result is a direct combination of carbon with oxygen while the other reacting substances remain unchanged.

In place of coke other suitable reducing substances may be used.

I claim—

1. A depolarizer for galvanic elements comprising nitrosyl-sulfuric acid dissolved in concentrated sulfuric acid.

2. A depolarizer for galvanic elements comprising nitrosyl-sulfuric acid dissolved in concentrated sulfuric acid and oxygen.

3. A depolarizer for galvanic elements comprising nitrosyl-sulfuric acid dissolved in concentrated sulfuric acid and air supplied to said nitrosyl-sulfuric acid.

4. A galvanic element comprising two electrodes of carbon, an electrolyte of sulfuric acid covering one of the electrodes and containing nitrosyl-sulfuric acid, and air supplied to the other electrode.

5. In a galvanic element having two carbon electrodes of different forms of carbon, an electrolyte of sulfuric acid covering one of the electrodes and containing nitrosyl-sulfuric acid, and means to supply air to the other electrode.

In testimony, that I claim the foregoing as my invention, have signed my name in presence of two subscribing witnesses.

ERNST WALDEMAR JUNGNER.

Witnesses:
  T. BOŸE,
  FRITHIOF NYLIN.